Dec. 27, 1960  A. E. NEUMANN  2,966,350
REVERBERATORY FURNACE AND METHOD FOR RECLAIMING
LEAD FROM STORAGE BATTERIES
Filed Aug. 13, 1956  3 Sheets-Sheet 1
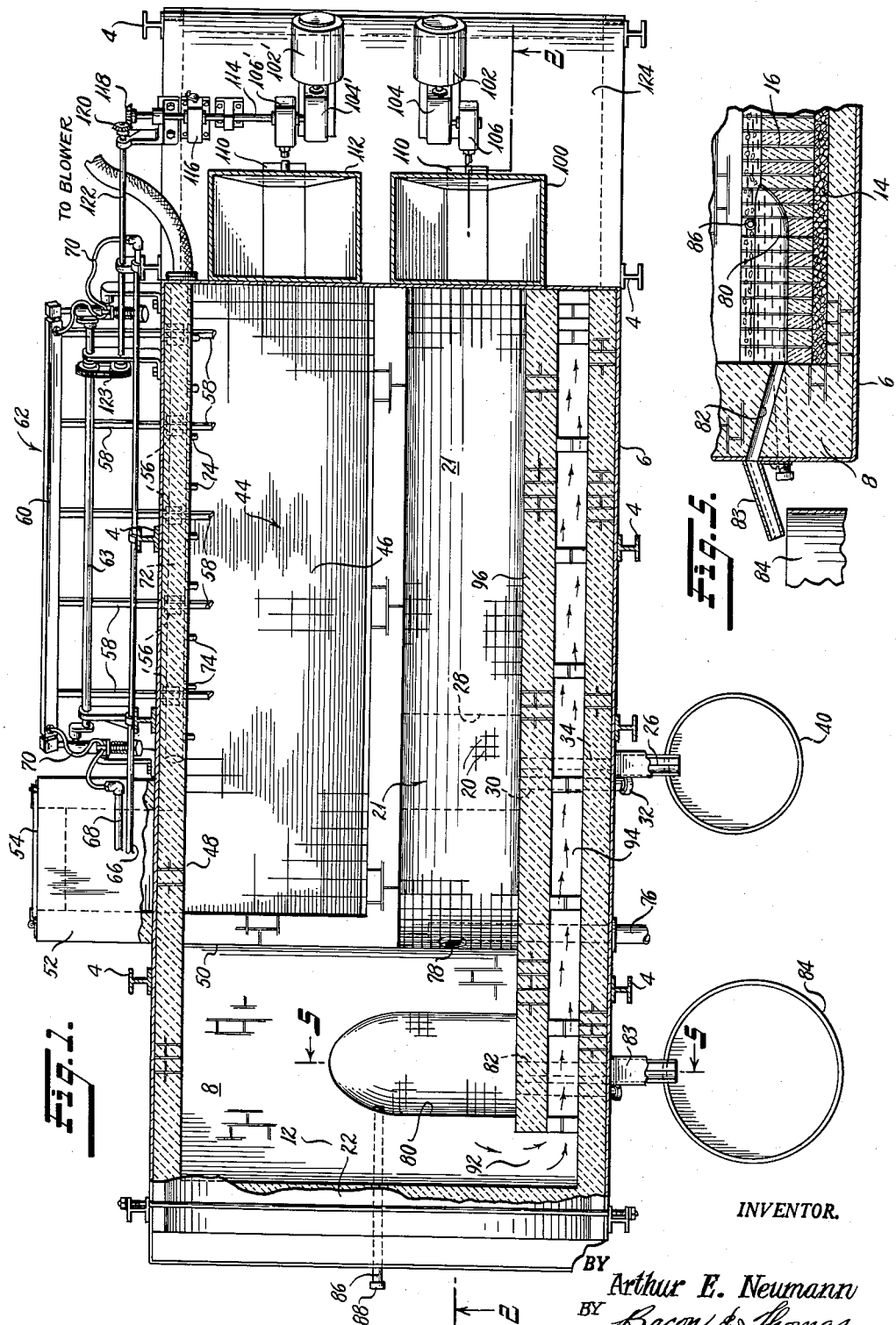
INVENTOR.
Arthur E. Neumann
BY Bacon & Thomas
ATTORNEYS Dec. 27, 1960 A. E. NEUMANN 2,966,350
REVERBERATORY FURNACE AND METHOD FOR RECLAIMING
LEAD FROM STORAGE BATTERIES
Filed Aug. 13, 1956 3 Sheets-Sheet 2
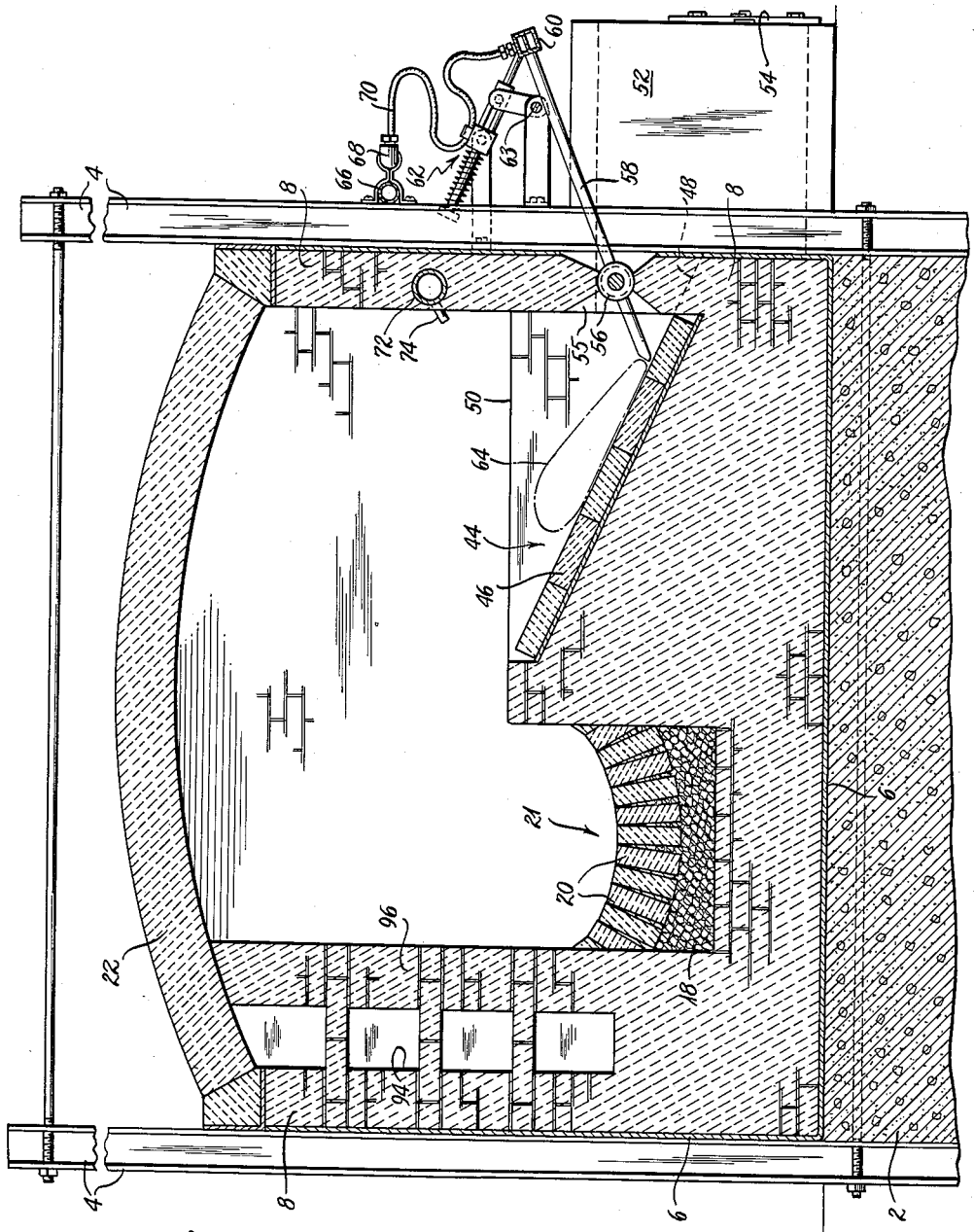
INVENTOR.
Arthur E. Neumann
BY
Bacon & Thomas
ATTORNEYS Dec. 27, 1960 A. E. NEUMANN 2,966,350
REVERBERATORY FURNACE AND METHOD FOR RECLAIMING
LEAD FROM STORAGE BATTERIES
Filed Aug. 13, 1956 3 Sheets-Sheet 3
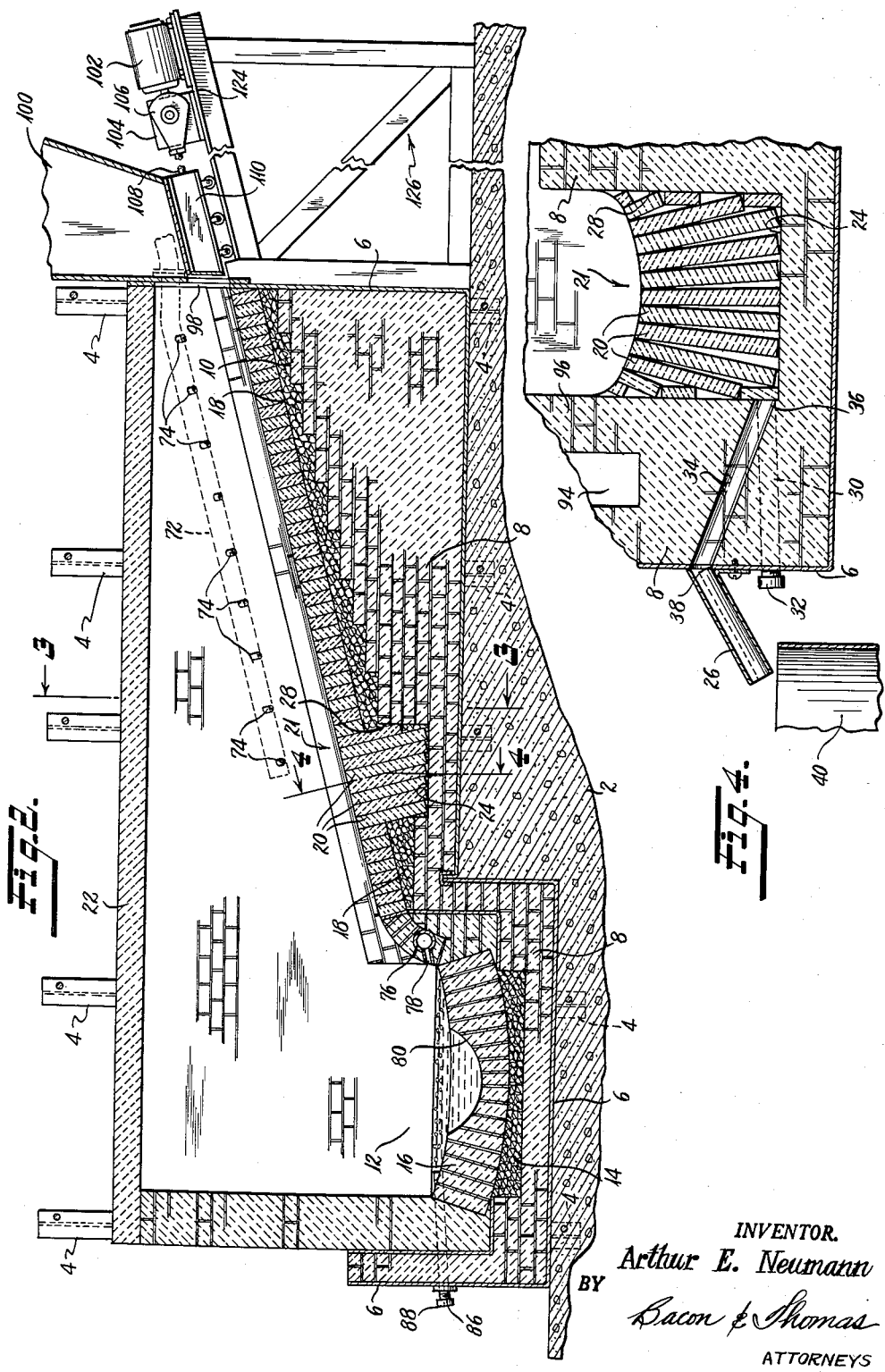
INVENTOR.
Arthur E. Neumann
BY
Bacon & Thomas
ATTORNEYS

United States Patent Office 2,966,350
Patented Dec. 27, 1960

2,966,350

REVERBERATORY FURNACE AND METHOD FOR RECLAIMING LEAD FROM STORAGE BATTERIES

Arthur E. Neumann, 314 N. Aberdeen St., Chicago, Ill., assignor of one-half to Frank Scoby, Chicago, Ill.

Filed Aug. 13, 1956, Ser. No. 603,618

3 Claims. (Cl. 266—33)

This invention relates to apparatus and method for reclaiming lead from discarded storage batteries. The method consists essentially of draining acid from the old batteries, crushing the cases and lead-containing portions to relatively small particle size, washing acid from the particles and separating combustible particles from lead-containing particles by flotation, burning the combustible particles in a chamber and directing the heat of combustion to the lead-containing particles for melting the free lead therefrom and utilizing a part of said heat to reduce or convert lead compounds to metallic lead.

The furnace in which the burning and melting takes place comprises a pair of channels in generally parallel arrangement and in one of which the combustible particles are fed while being moved therealong and in the other of while the lead-containing particles are positioned to receive heat from the other channel whereby to melt the lead. The melted lead compounds flow from the second channel into a reverberatory pit which is also kept hot by combustion of the materials in the first channel and wherein suitable fluxes and/or reducing agents are added to the melt to convert the lead compounds to pure metallic lead and from which pit the lead and slag may be separately withdrawn. The invention includes a novel sequence of steps in the recovery method and also includes novel furnace structure of the nature set forth above.

The metal components of the discarded batteries are normally an alloy of antimony, arsenic, tin, and lead from which the lugs and grids are cast. The alloy is melted and recovered as a separate body, in the present furnace, without changing the nature of the alloy which may thus be reused for casting new battery parts without the necessity of compounding new alloys therefrom. The lead compounds are converted, in a separate portion of the furnace, to pure metallic lead which is recovered separately from the previously melted alloys.

It is therefore an object of this invention to provide a new method and apparatus for utilizing the heat energy in the cases and other portions of storage batteries to melt and convert the lead components of the battery, for recovery thereof in clean metallic form.

Another object of the invention is to provide a method and apparatus for recovering lead from storage batteries wherein metallic alloys in the batteries are recovered separately from the pure lead components.

Still another object of this invention is to provide novel furnace structure for accomplishing the above-noted objectives.

A further object is to provide a lead reclaiming furnace incorporating novel means for withdrawing molten lead therefrom.

A still further object is to provide a method and apparatus as set forth hereinabove wherein materials are in part fed through the apparatus by the action of gravity thereon.

An additional object is to provide, in a furnace construction, a metal pervious supporting surface for metal-containing materials which surface is constructed in a novel and simple manner without the use of cast or molded grates.

Another additional object is to provide a metal recovery furnace having novel molten metal collecting means therein.

Further and additional objects and advantages will become apparent to those skilled in the art as the description proceeds with reference to the accompanying drawings, wherein:

Fig. 1 is a top plan view of a furnace embodying the present invention, with the top thereof broken away and with certain parts shown in section;

Fig. 2 is a vertical sectional view through the furnace of Fig. 1 taken substantially along the line 2—2 of Fig. 1;

Fig. 3 is a transverse sectional view, on an enlarged scale, taken substantially along the line 3—3 of Fig. 2;

Fig. 4 is an enlarged fragmentary sectional view taken along the line 4—4 of Fig. 2; and Fig. 5 is a sectional view taken substantially along the line 5—5 of Fig. 1.

According to the present invention, discarded storage batteries are collected in any suitable and convenient manner and any acid remaining therein is drained and collected. The empty battery cases are then crushed to relatively small particle size by passing the same through suitable corrugated rollers or the like. The crushed particles comprise the casings, sealing materials, separators, lead terminals and grids, and lead-containing compounds within the grid structures. When crushed in the manner intended, the particles of the various components are intermingled and separation thereof is necessary. From the crushing rolls the crushed particles are dropped into the body of acid previously collected from the batteries wherein they are washed and then transferred to a water bath wherein the acid is washed from the particles and particles of combustible materials are separated from the particles of lead and lead compounds by "flotation." The technique of separating particles of different specific gravities by water flotation is well known and will not be described in further detail. The separating step separates the particles of the battery casings, separators and sealing material from the lead-containing components. The washing of acid from the particles reduces the formation of sulfur matte in subsequent treatment in a furnace, to be described. The particles of casings, separators and sealing material are combustible and it has been found that they contain more than enough heat energy than is necessary to melt all of the lead alloys in the batteries and to provide the heat for effecting conversion, by reduction or otherwise, of the lead-containing compounds. The separated combustibles and metal-containing components of the batteries are fed separately into the furnace to be described.

The hereinbefore described steps of preparing the materials may be readily carried out as a continuous process by the use of known apparatus, including conveyors and the like. Where continuous operation is practiced the separated particles would be conveyed to their respective feed hoppers, to be described, in a continuous stream and deposited therein for feeding into the furnace as required.

Referring now to the drawings, a suitable concrete base structure 2 is provided upon which the furnace of the present invention is constructed. Upright columns 4 are embedded in and/or secured to the concrete base 2 and serve to hold the brickwork, to be described, together and may also serve to support the roof or ceiling of the furnace in any well-known manner.

Referring particularly to Fig. 2, the base 2 supports a tanklike container or sheath 6 of sheet metal, preferably steel, within which the furnace is constructed. Within the sheath 6, brickwork 8 is erected and it comprises any suitable fire-resistant brick but preferably a brick having high heat-insulating characteristics. The brickwork 8 is all securely mortared together whereby the brickwork is rendered as nearly impervious as possible to the passage of molten metal therethrough or therebetween. The brickwork 8 at the forward part of the furnace, seen at the righthand end of Fig. 2, is formed to define a generally sloping, although stepped, upper surface 10. The slope of the surface 10 extends generally downwardly and rearwardly of the furnace. The brickwork 8 at the lefthand end, as seen in Fig. 2, is formed to define a reverberatory pit 12 below the level of the lowermost end of the surface 10. The brickwork 8 defining the pit 12 may have suitable crushed ceramic material 14 thereon at the bottom of the pit and bonded together by mortar to define a suitable curved supporting surface for a layer 16 of mortared brick defining a curved bottom surface for the reverberatory pit.

A layer of crushed ceramic material 18 (known as "grog") is placed loosely on the surface 10 without any binder or mortar and is suitably packed to form a smooth supporting surface for a layer of unmortared bricks 20 placed in side-by-side relation thereon to define a transversely curved hearth channel 21 (see also Figs. 3 and 4). The mortared brickwork 8 also extends upwardly at the sides of the furnace to define side walls and one or both end walls therefor and upon which a suitable roof or ceiling structure 22 is placed. The roof 22 is preferably transversely curved as shown in Fig. 3 for a purpose to be set forth later.

Adjacent the lowermost end of the hearth channel 21, the brickwork 8 is formed to define a recess 24 constituting a metal collecting basin. The bricks 20 over the recess 24 are longer than the others and are sufficiently long to reach the bottom of the recess. The space between the long bricks 20 in recess 24 provides a collection space for molten lead, as will be described in more detail.

It will be obvious from inspection of Figs. 2, 3 and 4, that molten metals in the hearth channel 21 will seep between the unmortared bricks 20 and through the loose material 18. Since the brickwork 8 is solidly mortared, the metal cannot pass therethrough or therebetween and must, therefore, flow downwardly along the surface 10 and will then enter the basin defined by recess 24 and be collected as a body of molten metal therein. Even though some small quantity of molten lead may seep through portions of the brickwork 8, it cannot leave the furnace since the brickwork 8 is surrounded by the sealed sheath 6 of steel or the like and will solidify and seal the collecting basin a short distance from the bricks 20. By this structure, although some lead may be lost in the brickwork 8 that quantity of lead will be relatively small and once all small openings are filed therewith no more lead can leave the collection system and all lead thereafter melted in the furnace will find its way to the recess 24.

As previously stated, the brickwork 8 is preferably of bricks having high heat-insulating characteristics whereas the unmortared bricks 20 and the crushed material 18 are preferably of magnesite brick which exhibits relatively high heat conductivity. The bricks 20 and material 18 thus readily conduct heat from the furnace and absorb the same until their temperature reaches a sufficiently high point to maintain all lead in contact therewith in a molten state whereby the lead is readily flowable to the collecting basin. The bricks 20 and material 18 further conduct sufficient heat to the collecting basin to maintain the body of lead therein in a permanently molten state as long as the furnace is in operation.

Referring now to Fig. 4, which is a transverse section through the collecting basin 24, a capped pipe or conduit 30 is shown communicating with the bottom of the recess 24 and the exterior of the furnace. During normal operation of the apparatus the pipe 30 is capped by a suitable cap 32 which may be removed upon shut-down to drain all molten lead and other materials that may be in the recess. A sloping straight opening 34 is provided through the brickwork 8 and having its inner end 36 communicating with the interior of the recess 24 adjacent the bottom thereof and which extends upwardly and outwardly therefrom to a predetermined level at 38. A suitable trough or the like 26 extends downwardly and outwardly from the outer end of opening 34 and into communication with a suitable container or holding pot 40. The trough 26 is preferably removable to permit easy cleaning of opening 34 and/or recess 24.

During operation of the furnace molten lead is continuously collected in the recess 24 and will rise therein and in the opening 34 until its level reaches the level 38 whereupon additional lead thereafter collected in recess 24 flows outwardly into the collecting tank 40. Thus, the level of the molten lead in recess 24 is maintained at substantially the level of point 38 but is continuously withdrawn therefrom, as collected. The "siphon" opening 34 does not permit air or other foreign material to enter the collecting basin from outside the furnace and the arrangement is such that only the molten metal itself is withdrawn without withdrawing any contaminants that may be present on the surface of the body of molten lead in the recess 24. Of course, the lead collected in the container 40 may be immediately cast into ingots or other shapes or may be disposed of in any desired manner before solidification thereof.

Referring now to Figs. 1 and 3, the brickwork 8 shown at the righthand side of Fig. 3 (top of Fig. 1) is constructed to define a heating or combustion channel 44 having a fuel supporting surface 46 sloping downwardly and rearwardly of the furnace in substantially parallel relation to the hearth channel 21, previously described. The fuel supporting surface 46 of the channel 44 is preferably formed of mortared brick whereby it is relatively imperforate and constitutes a solid and relatively smooth fuel supporting surface. The channel 44 terminates at its lower end in an ash drop 48 (Fig. 1) and a rear end wall 50 separates the inner end of surface 46 and ash drop 48 from the reverberatory pit 12 previously described. The ash drop 48 communicates with a suitable chamber 52 having a door 54 thereon through which ashes may be removed from the exterior of the furnace when desired or necessary.

The righthand side wall of the furnace, as seen in Fig. 3, is provided with a plurality of longitudinally spaced aligned openings 55 therethrough and with bearing assemblies 56 mounted in the openings 55 to slidably and rotatably support hollow agitating members 58. The outermost ends of the members 58 are connected to a manifold or header 60 which in turn is actuated by a mechanism indicated generally at 62 and driven by shaft 63 in such a manner that the innermost ends of the members 58 are caused to follow an orbital path 64 having a portion lying closely adjacent the surface 46 and which path lies in a plane substantially perpendicular to the surface 46. Suitable pipes 66 and 68 are connected by flexible conduits 70 to the manifold or header 60 to conduct and receive a suitable coolant, such as water, circulating through the hollow members 58 to maintain them safely cool while in operation. The details of the mechanism 62, the bearing assemblies 56, the members 58, and the mode of operation of the agitating members 58 are fully and clearly described in my copending application, now Patent No. 2,910,021, and will not be described in further detail here. However, since the innermost ends of the members 58 follow the orbital path 64, and agitate and stir the fuel resting on surface 46 in the manner described in the said copending application, that fuel is caused to move laterally upwardly of the sloping surface 46 and generally toward the center line of the furnace where it is released to the action of gravity, and, since the surface 46 also slopes toward the ash pit 48, the action of gravity on the burning fuel will be to cause that fuel to gravitate toward the next lower member 58 where the described cycle is repeated and the entire body of burning fuel is agitated and caused to progressively gravitate toward the ash pit.

The side wall of the furnace in which openings 54 are provided has a longitudinally extending conduit 72 therein which is provided with a plurality of nozzles 74 extending to the interior of the chamber and directed generally toward the upper portion of the orbital path 64 previously described. The conduit 72 is supplied with air under pressure from any suitable source (not shown) and the preheated air (preheated by the hot side wall of the furnace) issuing from the nozzles 74 impinges upon the agitated burning fuel in channel 44 to intimately mix therewith and contact all particles of the burning fuel. It has been found that this arrangement causes the combustible materials in the battery cases and separators to burn violently without the production of any smoke or condensable, combustible volatile materials. In other words, complete and smokeless combustion is produced and intense heat is generated in the furnace.

The heat generated in the channel 44 by the casing materials burning therein raises the temperature of the entire furnace and the heat is reflected and radiated from the channel 44 to the side walls and roof of the furnace which are so arranged that reflected and radiated heat is substantially concentrated in the hearth channel 21, previously described, to effect melting of the metal-containing materials therein.

Referring now to Figs. 1 and 2, a feed conduit 76 extends into the furnace and terminates in an outlet 78 adjacent the juncture of the hearth channel 21 and the reverberatory pit 12. Any suitable means (not shown) may be utilized to feed desired fluxes and/or reducing agents into the furnace through the opening 78 to mix with materials flowing from the hearth channel into the reverberatory pit and to act therein to convert the lead-containing compounds to pure lead and slag.

The heat provided by the burning battery case particles is more than enough to melt the free lead contained in the batteries and is in sufficient excess to maintain the temperature in the reverberatory pit 12 at a sufficiently high value to keep the oxides and other lead compounds therein in a molten state and to effect conversion thereof to lead and slag. In fact, the oxides and other compounds are in the molten state while still in the reverberatory channel and they flow therefrom downwardly over the opening 78 into the reverberatory pit. Molten lead on the upper surface of the hearth channel 21 serves to support and "lubricate" the solid and molten or melting lead compounds to prevent their entering the collecting basin 24 and facilitate gravitational flow thereof toward reverberatory pit 12.

The brickwork 16 defining the bottom of the reverberatory pit 12 also defines a collecting basin 80 for the collection of molten lead converted from the compounds. As seen in Fig. 5, a siphon opening 82 and trough 83 are provided substantially identical to the siphon 34 described in connection with Fig. 4 and through which recovered molten lead may be withdrawn from the basin 80 at a uniform rate into any suitable collecting container 84.

The furnace is further provided with a pipe or conduit 86 communicating with the reverberatory pit at the upper portion thereof and through which slag may be withdrawn as desired, or as formed. The pipe 86 may be provided with a cap 88 or any other suitable closure.

The gaseous products of combustion in the furnace pass toward the rear thereof and form a hot body over the reverberatory pit 12 and thence pass through an opening 92 (Fig. 1) in the side wall of the furnace into a duct 94 formed within the furnace side wall and extending to the front end of the furnace where the duct 94 communicates with any suitable flue or stack (not shown). By reference to Fig. 3, it will be noted that the duct 94 conducts hot gases generally along the side wall of the hearth channel 21. Preferably the furnace wall outwardly of the duct 94 is formed of insulating bricks 8 whereas that portion 96 of the furnace side wall between the duct 94 and the hearth channel 21 is formed of heat-conducting magnesite brick whereby a substantial quantity of heat is recovered from the flue gases to maintain the wall portion 96 at a high temperature to assist in keeping the materials in the hearth channel in a molten state.

The hearth channel 21 communicates at its forward upper end with an inlet opening 98 (Fig. 2) communicating with the interior of a hopper 100. A motor 102 driving through a reduction gearing 104 to a suitable mechanism 106 (disclosed in my copending application previously identified), drives a rod 108 in reciprocation to reciprocate a ram 110. The upper surface of the ram 110 defines the bottom of the hopper 100 whereby withdrawal of the ram upwardly by the motor 102 permits materials to drop in front of the ram 110 whereupon downward movement of the ram forces those materials into the hearth channel of the furnace. The lead and lead-containing compounds previously referred to are deposited in the hopper 100 to be fed therefrom into the furnace at a uniform rate, for treatment in the manner described. A second hopper 112 (Fig. 1) may be identical to the hopper 100 and is provided for the reception of the crushed particles of the battery casings, sealing material and separators and constituting a supply of fuel for the furnace. The heating channel 44 previously described also communicates at its upper end with an opening (not shown) communicating with the hopper 112 in the same manner as described in connection with the opening 98. A second ram 110 driven through mechanisms 106' and 104' by a motor 102' acts to feed fuel particles from hopper 112 into the furnace. The mechanism 106', however, is provided with an output shaft 114 driving through a variable speed transmission 116 to a bevel gear 118. The bevel gear 118 meshes with a bevel gear 120 fixed on a shaft 122 arranged to drive the shaft 63 through a chain 123, for actuating the agitating members 58 in the manner described. The hoppers 100 and 112, the motors and driving mechanisms 104, 106, 104' and 106', shaft 114, bevel gears 118 and 120 and shafts 122 and 63, and mechanism 62 correspond substantially identically to similar mechanisms described in my previously referred to copending application. As described therein, the variable speed transmission mechanism 116 may be adjusted to regulate the rate of operation of the agitating members 58 relative to the feed of combustible materials into the furnace so that all materials are completely burned by the time they have been advanced to the brink of the ash pit. Likewise, the motors 102 and 102' are preferably of the variable speed variety whereby their speeds of operation may be regulated to balance the rate of feed of fuel to the rate of feed of lead-containing materials into the furnace.

The motors 102 and 102', the hoppers 100 and 112 and their associated mechanisms as described herein, may be mounted on a suitable platform 124 supported by a framework 126 adjacent the forward end of the furnace, as shown in Fig. 2.

Upon placing the furnace in operation, a fire may be started in the heating channel 44 with paper, wood or the like to provide enough initial heat to ignite the combustible particles and the fuel feeding mechanism may then be started slowly to establish a good fire for initially heating the furnace. When the central portion of the furnace reaches a temperature of about 1200° F. the motor 102 is started to slowly feed lead-containing particles to the hearth channel 21 for melting therein in the manner described.

As an alternative mode of operation, the outlet from the collecting basin 24 may be closed, or even connected to the reverberatory pit, so that all the free metals melted in the channel 21 flow to the pit 12 to be mixed with the lead recovered therein.

Due to the high turbulence of the gases in the described furnace, and other factors, a small amount of lead oxide and/or other lead compounds is entrained in the flue gases and is carried therewith out the flue. However, due to the complete combustion achieved and the low temperature (250° F.) of the flue gases, those gases contain no unburned hydrocarbons or condensable tars or the like. It is therefore practical to filter the flue gases in a conventional "bag house" device to recover those lead compounds without fouling the filter with soot, tar, or the like. As an alternative, the compounds may be separated from the flue gases by means of an electrostatic precipitator or equivalent device.

While a single specific embodiment of the invention has been shown and described herein, it is to be understood that other modifications, falling within the scope of the appended claims, are contemplated as being included in applicant's invention.

I claim:

1. In a metal reclaiming furnace; a base portion of mortared fire brick, a layer of crushed ceramic material overlying said base portion, a layer of unmortared bricks arranged and side-by-side relation on said crushed ceramic material and defining an unobstructed sloping bottom for a hearth channel, a collecting basin in said base portion in communication with said layer of crushed ceramic material for collecting molten metal seeping between said unmortared bricks, and means at the lower end of said sloping channel for collecting other materials in a body separate from said molten metal.

2. A furnace as defined in claim 1 wherein said layer of unmortared bricks and said crushed ceramic material have relatively high heat conductivity and wherein said mortared bricks of said base portion have high heat-insulating properties.

3. A furnace for the recovery of metals from articles containing said metals and combustible materials comprising, a furnace structure having front, rear, side and top walls, a combustion and melting section adjacent the front of the furnace structure and including a pair of sloping hearths extending side by side between the side walls and sloping downwardly from the front wall, means for feeding the combustible materials of the articles onto one of the sloping hearths, means for feeding the metals of the articles onto the other sloping hearth, means for supplying combustion supporting air to the combustion and melting section adjacent said one sloping hearth for burning the combustible materials to generate heat for melting at least some of the metals on said other sloping hearth, a portion of said sloping hearths adjacent their lower ends being pervious to the molten metals, a sump beneath the pervious portion of said sloping hearths collecting the molten metals passing therethrough, a reverberatory section adjacent the rear of the furnace structure and including a holding hearth extending between the side walls and the rear wall and sloping hearth and receiving from said other sloping hearth the remainder of the metals which do not pass to the sump, and means for circulating the hot gases of combustion from the combustion and melting section through the reverberatory section for reverberatorily heating the metals on the holding hearth therein.

References Cited in the file of this patent

UNITED STATES PATENTS

| 284,992 | Wilson | Sept. 11, 1883 |
|---|---|---|
| 334,207 | Wetherill | Jan. 12, 1886 |
| 589,210 | Hall | Aug. 31, 1897 |
| 1,420,312 | Grindle | June 20, 1922 |
| 1,869,591 | Wagstaff | Aug. 2, 1932 |
| 1,886,938 | Brett et al. | Nov. 8, 1932 |
| 1,938,832 | Hougen et al. | Dec. 12, 1933 |
| 2,006,256 | Betterton | June 25, 1935 |
| 2,041,844 | Lindner | May 26, 1936 |
| 2,331,992 | MacDonell | Oct. 19, 1943 |
| 2,552,430 | Jackson | May 8, 1951 |
| 2,589,301 | Smith | Mar. 18, 1952 |
| 2,683,032 | Hartman | July 6, 1954 |
| 2,756,044 | Neumann | July 24, 1956 |

OTHER REFERENCES

Engineering and Mining Journal, vol. 145, No. 3, March 1944. (Pages 80–83 relied on.)